(12) United States Patent
Tayu et al.

(10) Patent No.: US 7,608,153 B2
(45) Date of Patent: *Oct. 27, 2009

(54) RARE EARTH MAGNET AND METHOD THEREFOR

(75) Inventors: Tetsurou Tayu, Yokosuka (JP); Hideaki Ono, Yokohama (JP); Takae Ono, legal representative, Yokohama (JP); Yoshio Kawashita, Yokosuka (JP); Makoto Kano, Yokohama (JP); Munekatsu Shimada, Hachioji (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 337 days.

This patent is subject to a terminal disclaimer.

(21) Appl. No.: 11/017,010

(22) Filed: Dec. 21, 2004

(65) Prior Publication Data

US 2005/0133117 A1      Jun. 23, 2005

(30) Foreign Application Priority Data

Dec. 22, 2003   (JP)   ............................. 2003-424639

(51) Int. Cl.
*H01F 1/053* (2006.01)
*H01F 1/057* (2006.01)

(52) U.S. Cl. ..................... 148/302; 148/301; 148/122; 148/101; 148/105

(58) Field of Classification Search ................ None
See application file for complete search history.

(56) References Cited

U.S. PATENT DOCUMENTS

| | | | |
|---|---|---|---|
| 4,762,574 A * | 8/1988 | Ghandehari | 148/103 |
| 4,891,078 A * | 1/1990 | Ghandehari | 148/301 |
| 6,984,271 B2 * | 1/2006 | Tayu et al. | 148/301 |
| 7,147,686 B2 * | 12/2006 | Tayu et al. | 75/244 |
| 2002/0112785 A1 * | 8/2002 | Sekine et al. | 148/302 |
| 2007/0012380 A1 * | 1/2007 | Tayu et al. | 148/105 |

FOREIGN PATENT DOCUMENTS

| | | | |
|---|---|---|---|
| JP | 01-175705 A | | 7/1989 |
| JP | 04-116101 A | | 4/1992 |
| JP | 06-069009 A | | 3/1994 |
| JP | 6-69009 A | | 3/1994 |
| JP | 07-201545 | * | 8/1995 |
| JP | 61-253805 | * | 11/1996 |
| JP | 10-321427 A | | 12/1998 |
| JP | 11-251125 | | 9/1999 |
| JP | 11-251125 A | | 9/1999 |
| JP | 2000-082610 | * | 3/2000 |
| JP | 2002-064010 | * | 2/2002 |
| JP | 2002-105503 A | | 4/2002 |
| JP | 2003-41303 A | | 2/2003 |
| JP | 2003-264115 A | | 9/2003 |

OTHER PUBLICATIONS

Machine translation of Japanese Patent Publication 2000-082610, Mar. 21, 2000.*
Machine translation of Japanese Patent Publicaion No. 2002-064010, Feb. 2, 2002.*

* cited by examiner

*Primary Examiner*—John P. Sheehan
(74) *Attorney, Agent, or Firm*—Foley & Lardner LLP

(57) ABSTRACT

A rare earth magnet includes rare earth magnet particles; and amorphous and/or crystalline terbium oxide present at the boundary of the rare earth magnet particles and represented by the formula: $TbO_n$, wherein $1.5 < n \leq 2$. The rare earth magnet prevents decrease eddy current effectively.

14 Claims, 3 Drawing Sheets

1

RARE EARTH MAGNET AND METHOD THEREFOR

BACKGROUND OF THE INVENTION

1. Field of the Invention

The present invention relates to a rare earth magnet having high electric resistance, and in particular, relates to a rare earth magnet with high electric resistance to be used in a motor for electronic equipment and automobile driving.

2. Description of Related Art

An inexpensive ferritemagnet has conventionally been used widely as a magnet for a permanent magnet type motor. However, use of a rare earth magnet with higher performance has been increasing year by year with demand for development of more compact rotating electrical appliances with higher performance. Development of a rare earth magnet, represented by Sm—Co type magnet and Nd—Fe—B type magnet, is under way, aiming at higher performance and lower price. A rare earth magnet, however, has low electric resistance because it is a metal magnet, leading to a problem of lowering a motor efficiency due to increased eddy-current loss when built in a motor. Therefore, various technologies have been proposed to solve the above problem by forming structure with insulating material inserted inside the rare earth magnet to increase electric resistance of a molded rare earth magnet itself.

For example, a rare earth magnet, wherein magnetic powder for rare earth magnet is bound by $SiO_2$ and/or $Al_2O_3$ particles, is proposed (see JP-A-10-321427). A method for producing a rare earth magnet is also disclosed, where $M(OH)_n$ coated powder composed of sol liquid of a metal alkoxide hydrolyzate, $M(OH)_n$ (M is one or more kinds of metal elements such as Si, Zr, Ti, Al, Cr, Ce, Co and Y; n is valence of M) and rare earth-iron type magnet particles are heated under compression, and these powder are fixed by electrical heating and compression using pulsed current while forming an amorphous metal oxide layer $(MO_{(n/2)})$ at the boundary of the rare earth-iron type magnet particles, and (see JP-A-6-69009).

BRIEF SUMMARY OF THE INVENTION

As shown in JP-A-10-321427, $SiO_2$ and/or $Al_2O_3$ present at the boundary of magnetic particles for rare earth magnet can increase electric resistance of the rare earth magnet. However, when $SiO_2$ and/or $Al_2O_3$ are added alone to the rare earth magnet, magnetic characteristics thereof are significantly lowered, making application of the magnet to a motor with medium to high output difficult.

A metal oxide $(MO_{(n/2)})$ of a metal M (Si, Zr, Ti, Al, Cr, Ce and Co) described in JP-A-6-69009 is so poor in thermodynamic stability that chemical reaction proceeds between magnet particles and a metal oxide layer $(MO_{(n/2)})$ in a fixing step by heating under compression, resulting in significantly lowered magnetic characteristics of the rare earth magnet. When yttrium (Y) is used as the metal M, a metal oxide formed has high thermodynamic stability. Therefore, it has small decrease in magnetic characteristics by chemical reaction between magnet particles and a metal oxide in the fixing step by heating under compression. However, an alkoxide of a rare earth element such as Y is easily hydrolyzed because the rare earth element and an oxygen atom of the alkoxy group are ionically bonded. Consequently, when an amorphous metal oxide layer $(MO_{(n/2)})$ is formed at the boundary of magnet particles by a sol-gel method starting from a metal alkoxide of a rare earth element including Y, produced sol is easily gelled, then posing a problem of forming a coated film with rough surface caused by gel particles grown large in a liquid or a problem of forming turbid liquid or deposit caused by gelation of most part of sol. In other words, stable production of a rare earth magnet is difficult, when sol containing an alkoxide of a rare earth element such as Y is used for producing a rare earth magnet.

As described above, conventional technologies have posed problems of significantly lowering of magnetic characteristics and inability of stable production of a rare earth magnet, although they can suppress eddy current generation by increasing electric resistance of a rare earth-magnet.

It is an object of the present invention to provide a rare earth magnet that can effectively suppress eddy current and has less degradation of magnetic characteristics by suppression means of eddy current. It is also an object of the present invention to provide a method for stable production of such a rare earth magnet.

In an aspect of the invention, a rare earth magnet includes rare earth magnet particles and amorphous and/or crystalline terbium oxide present at the boundary of the rare earth magnet particles and represented by the following formula (I):

$$TbO_n \quad (I)$$

wherein $1.5 < n \leq 2$.

A rare earth magnet of the present invention can be produced by preparing a mixture of magnetic powder for rare earth magnet and terbium oxide powder and then molding the mixture, or can be produced by preparing particles for rare earth magnet to which surface the terbium oxide is bound in advance, and then molding the particles.

DETAILED DESCRIPTION OF THE INVENTION

The first aspect of the present invention is a rare earth magnet including rare earth magnet particles and amorphous and/or crystalline terbium oxide present at the boundary of the rare earth magnet particles and represented by following formula (I):

$$TbO_n \quad (I)$$

wherein $1.5 < n \leq 2$.

First of all, a rare earth magnet of the present invention will be described by referring to the figures.

Figure 1:
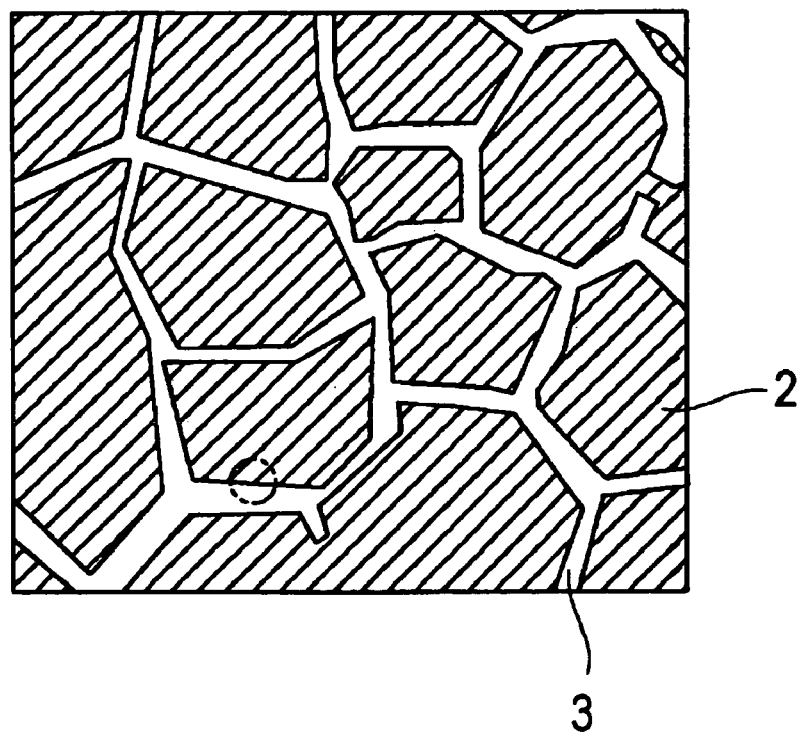
FIG. 1 is a cross-sectional schematic view of a rare earth magnet of the present invention.
Figure 2:
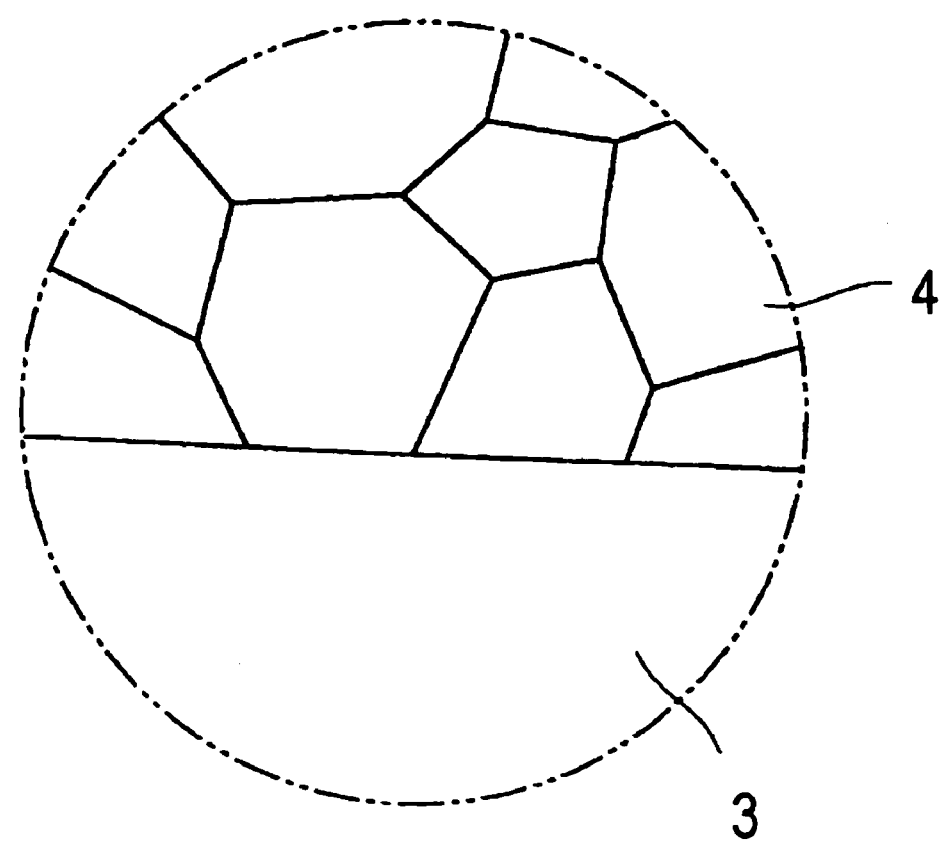
FIG. 2 is a magnified view of a part enclosed by a broken line in FIG. 1.

FIG. 1 is a cross-sectional schematic view of a rare earth magnet of the present invention. A rare earth magnet 1 of the present invention includes rare earth magnet particles 2 expressing magnetic characteristics and an insulating terbium oxide 3. The terbium oxide 3 is present at the boundary of the rare earth magnet particles 2 and the rare earth magnet particles 2 have structure connected by the terbium oxide 3. FIG. 2 is a magnified view of a part enclosed by a broken line in FIG. 1. The rare earth magnet particles 2 is a cluster of many fine crystal grains 4 as shown in FIG. 2, when magnetic particles for an anisotropic rare earth magnet, prepared by using an HDDR method or a hot deformation (die-upsetting and backward extrusion), are used as raw materials for the rare earth magnet particles 2. As to particle size in this case, the size of the rare earth magnet particles 2 is generally from 1 to 500 µm, while the size of the crystal grains 4 composing the rare earth magnet particles 2 is not more than 500 nm.

Terbium oxide 3 thus present at the boundary of the rare earth magnet particles 2 in the rare earth magnet 1 functions as an insulator and increases remarkably electric resistance of the rare earth magnet 1. This in turn suppresses eddy current induced in the magnet when it is placed in alternating current magnetic field. It is preferable for the rare earth magnet particles 2 to be covered completely with the terbium oxide 3, but they may be covered partially as long as effects of increasing electric resistance and suppressing eddy current are expressed. The terbium oxide 3 may take a continuous wall shape enclosing the rare earth magnet particles 2 as shown in the figure, or may take a connected cluster shape of particles isolating the rare earth magnet particles 2. Incidentally, the figure is a simplified form for easy understanding and technical scope of the present invention is not limited to such a magnet embodiment shown in the figure.

In addition, the terbium oxide specified in the present invention exhibits so poor reactivity with a rare earth element that a rare earth magnet produced has quite superior magnetic characteristics even when under severe producing conditions such as hotforming.

The content of the terbium oxide may be determined in consideration of desired electric resistance value and magnetic characteristics. When magnetic characteristics have priority, the content of the terbium oxide may be decreased. When electric resistance value has priority, the content of the terbium oxide may be increased. However, too low content of the terbium oxide may not provide a rare earth magnet after molding with sufficiently high electric resistance. Therefore, the content of the terbium oxide is preferably not less than 0.1 wt %, more preferably not less than 1 wt % based on total weight of the magnet. On the other hand, too high content of the terbium oxide may provide significant decrease in magnetic characteristics of a rare earth magnet after molding. Therefore, the content of the terbium oxide is preferably not more than 20 wt %, more preferably not more than 10 wt %, and further more preferably not more than 5 wt % based on total weight of the magnet. (Rare earth magnet particle)

"Rare earth magnet particle" in the present application means a component of a rare earth magnet as shown in FIG. 1. The rare earth magnet particles are composed of a ferromagnetic main phase and other components. In the case of Nd—Fe—B type rare earth magnet, the main phase is an $Nd_2Fe_{14}B$ phase. In the light of improvement of magnetic characteristics, the rare earth magnet particles are preferably those produced from magnetic particles for an anisotropic rare earth magnet by use of an HDDR method or a hot deformation (die-upsetting and backward extrusion). The rare earth magnet particles produced from magnetic particles for an anisotropic rare earth magnet by using an HDDR method or a hot deformation (die-upsetting and backward extrusion) take a cluster shape of the many crystal grains 4 as shown in FIG. 2. In this case, the crystal grains 4 having average grain diameter not larger than diameter of single magnetic grain, are suitable for improving coercive force. Rare earth magnet particles include Sm-Co type magnet and the like, in addition to Nd—Fe—B type magnet. Nd—Fe—B type magnet is preferable from the viewpoint of magnetic characteristics or production cost of a rare earth magnet produced. However, a rare earth magnet of the present invention is by no means limited to Nd—Fe—B type magnet. Two or more kinds of rare earth magnets may sometimes be included in a rare earth magnet. More specifically, two or more Nd—Fe—B type magnets with different composition may be included, or an Nd—Fe—B type magnet and a Sm—Co type magnet may be mixed and present. "Nd—Fe—B type magnet" in the present application means concept including a form where a part of Nd or Fe is substituted by other elements. A part of or whole amount of Nd may be substituted with Pr, or a part of Nd may be substituted with other rare earth elements such as Tb, Dy and Ho. Either one or both of these elements may be used as a substituent. Substitution can be practiced by adjusting the blending quantity of elements for alloy. Coercive force of Nd—Fe—B type magnet can be increased by such substitution. The amount of Nd to be substituted is preferably not less than 0.01 atom % and not more than 50 atom % based on Nd. The amount below 0.01 atom % may provide insufficient effect of substitution, while the amount over 50 atom % may fail to maintain residual magnetic flux density at high level.

On the other hand, Fe may be substituted with other transition metals such as Co. Curie temperature (Tc) of Nd—Fe—B type magnet can be raised by such substitution, and the usable temperature range can be widened. The amount of Fe to be substituted is preferably not less than 0.01 atom % and not more than 30 atom % based on Fe. The amount below 0.01 atom % may provide insufficient effect of substitution, while the amount over 30 atom % may significantly lower coercive force.

Average particle diameter of rare earth magnet particles in a rare earth magnet is preferably from 1 to 500 µm, and more preferably from 10 to 500 µm. The average particle diameter of rare earth magnet particles below 1 µm may provide larger specific surface area of the magnet, resulting in higher effect of oxidative degradation, and thus may lower magnetic characteristics of the rare earth magnet. On the other hand, the average particle diameter of rare earth magnet particles over 500 µm may induce crush of the magnet particles by pressure during production, resulting in difficulty in obtaining sufficient electric resistance. In addition, in production of an anisotropic magnet from magnetic particles for an anisotropic rare earth magnet as raw materials, it is difficult to attain orientation of allmain phase ($Nd_2Fe_{14}B$ phase in Nd—Fe—B type magnet) in the magnetic particles for rare earth magnet over a size range of above 500 µm. Particle diameter of rare earth magnet particles can be controlled by adjusting particle diameter of raw material magnetic particles for rare earth magnet. Incidentally, the average particle diameter of rare earth magnet particles can be measured from SEM image (the same hereinafter in the present application).

(Terbium Oxide)

Terbium oxide present at the boundary of the rare earth magnet particles is a compound represented by the above-described formula (I). In the formula (I), n is more than 1.5 and not more than 2. In other words, oxygen atoms are present in the range of over 1.5 and not more than 2 based on 1 terbiumatom. The terbium oxide includes $Tb_4O_7$, terbium oxide having oxygen defect and the like. The terbium oxide may be amorphous or crystalline. Both amorphous terbium oxide and crystalline terbium oxide may be present in terbium oxide.

Terbium oxide can be placed at the boundary of rare earth magnet particles by various producing methods as described next. For example, a rare earth magnet where terbium oxide is present at the boundary of rare earth magnet particles can be obtained by mixing magnetic particles for rare earth magnet and terbium oxide powder to obtain a mixture, and then molding the mixture. A rare earth magnet where terbium oxide is present at the boundary of rare earth magnet particles may be produced also by hotforming of magnetic particles for rare earth magnet, to whole of or a part of which surface terbium oxide is bound. Terbium oxide bound to the surface of magnetic particles for rare earth magnet can be formed by hydrolyzing terbium alkoxide placed on the surface of magnetic particles for rare earth magnet. Details of these producing methods will be described later.

(Types of a Rare Earth Magnet)

The present invention is applicable to any of an isotropic magnet produced from isotropic magnet powder, an isotropic magnet obtained by random orientation of anisotropic magnet powder and an anisotropic magnet obtained by orientation of anisotropic magnet powder into the same direction. When a magnet with high maximum energy product is needed, an anisotropic magnet is preferable, which is prepared by orientation of anisotropic magnet powder as raw materials in magnetic field.

Then a method for producing a rare earth magnet, the second aspect of the present invention will be explained. The second aspect of the present invention is a method for producing a rare earth magnet containing a mixing process of preparing a mixture by mixing magnetic powder for rare earth magnet and terbium oxide powder represented by the formula (I):

$$TbO_n,$$

wherein $1.5<n\leqq2$; a filling process of filling the mixture into a mold; and a molding process of molding the mixture filled in the mold. Explanation of each process is given below in the order thereof.

(Preparation of a Mixture)

In the present invention, "magnet powder for rare earth magnet" means magnet powder as raw materials of rare earth magnet particles composing a rare earth magnet. The magnet powder for rare earth magnet is produced by compounding raw materials in accordance with composition of a rare earth magnet to be produced. When Nd—Fe—B type magnet having an $Nd_2Fe_{14}B$ main phase is produced, Nd, Fe and B are compounded in specified amount. Magnet powder for rare earth magnet, which is produced by using a known method and obtained as commercial products, may be used. Preferably, anisotropic magnet powder for rare earth magnet produced by a UPSET method using an HDDR method or hot deformation (die-upsetting and backward extrusion) is used. Such anisotropic magnet powder for rare earth magnet is cluster of multiple crystal grains. The crystal grains composing anisotropic magnet powder for rare earth magnet suitably have average particle diameter not more than diameter of a single magnetic grain in view of improving coercive force. Specifically, the average particle diameter of the crystal grains is preferably not more than 500 nm. The HDDR method is a technique to decompose $Nd_2Fe_{14}B$ compound as a main phase into 3 phases, $NdH_3$, α-Fe and $Fe_2B$ by hydrogenation of Nd—Fe—B type alloy, followed by compulsory dehydrogenation to regenerate $Nd_2Fe_{14}B$. The UPSET method is a technique to crash Nd—Fe—B type alloy prepared by an ultra-quenching method, premold and perform hot deformation (die-upsetting and backward extrusion).

The average particle diameter of magnet powder for rare earth magnet is preferably from 1 to 500 μm. The average particle diameter of magnet powder for rare earth magnet below 1 μm may increase the effect of oxidative deterioration due to increased specific surface area of magnet powder for rare earth magnet and thus may decrease magnetic characteristics of a rare earth magnet. On the other hand, the average particle diameter of magnet powder for rare earth magnet over 500 μm may result in crashing of magnet particles caused by pressure during production, which may provide risk to decrease electrical resistance of a rare earth magnet obtained. In addition, when an anisotropic magnet is produced by using anisotropic magnet powder for rare earth magnet as raw materials, it is difficult for a main phase ($Nd_2Fe_{14}B$ phase in Nd—Fe—B type magnet) to have the same orientation direction in magnet powder for rare earth magnet having diameter over 500 μm. The average particle diameter of magnet powder for rare earth magnet can be controlled by selecting a crasher and rare earth magnet particles crashed.

Terbium oxide powder is contained in a rare earth magnet as insulating substance as a final form. In a method for producing terbium oxide powder, terbium oxide powder such as $Tb_4O_7$ or $TbO_2$ are first prepared as raw materials. Two or more kinds of terbium oxides may be used. Sintered material of terbium oxide is obtained by mixing the terbium oxide powder prepared, premolding the powder, and heat-treating it at 1300 to 2000° C. for 1 to 12 hours under atmospheric pressure. Raw materials may be obtained by oxidation treatment of terbium containing compound with specified particle diameter. The average oxidation number of terbium element in sintered material of terbium oxide obtained may be +3 or more. The oxidation valent may be adjusted through hydrogen reduction by heat treatment of a sintered material of rare earth oxide at 800° C. to 1200° C. for 4 to 12 hours in hydrogen atmosphere after appropriate crashing.

Terbium oxide powder obtained is used as is or after crashing with a crasher such as a ball mill and the like. Too large average particle diameter of terbium oxide powder tends to generate frequent collisions among magnet particles, resulting in reduced resistivity of bulk product. On the other hand, preparation of super fine particles is complicated. Therefore, the average particle diameter of terbium oxide powder is preferably from about 0.1 to 3 μm. As described above, preparation of powder composed of rare earth oxidation composite can suppress decrease in magnetic characteristics to minimum and further enhance electrical resistivity of a magnet.

A mixture is obtained by using magnet powder for rare earth magnet prepared and terbium oxide powder. When rare earth oxide powder other than terbium oxide powder is used, specified rare earth oxide powder is compounded together with terbium oxide powder. When other components are to be compounded in a magnet, specified components may be added at this stage. Incidentally, "mixture" in the present invention represents not only simple a mixture of magnet powder for rare earth magnet and terbium oxide powder but also physically or chemically bonded state of magnet powder for rare earth magnet and terbium oxide powder. When considered that the final state is enclosure of rare earth magnet particles by terbium oxides as shown in FIG. 1, use of magnet powder for rare earth magnet covered by terbium oxide, as a mixture, is preferable in view of operation efficiency, A method to be used for producing these magnet powder for rare earth magnet includes, producing technique by use of CVD by using rare earth complex compounds as starting materials and coating technique at the surface of magnet powder for rare earth magnet by using liquid containing terbium oxide powder. Other methods may also be used.

The amount of terbium oxide in a mixture is preferably from 0.1 to 20 wt %, more preferably from 1 to 10 wt % based on total amount of magnet powder for rare earth magnet and terbium oxide powder. A sieve may be used to control particle diameter of terbium oxide powder used.

(Filling of a Mixture into a Mold)

A mixture is filled into a mold. Shape of the mold is not especially limited and may be determined in accordance with to the position to which a magnet is applied. In filling the mixture into the mold, the mixture is preferably subjected to premolding under appropriate pressure. The pressure for premolding is preferably from about 49 to 490 MPa. When magnet powder for rare earth magnet used is anisotropic magnet powder, an anisotropic rare earth magnet can be obtained by premolding magnet powder for rare earth magnet, while subjecting the magnetic powder for rare earth magnet to magnetic field orientation. Magnetic field intensity added in this case is preferably from about 1.2 to 2.2 MA/m.

(Molding of a Mixture)

A bulk magnet is obtained by molding a mixture filled in a mold. Compressing work of the mixture by the above-described premolding is not included in "molding" in the present invention. Known equipment generally used in magnet production can be used in molding. The filled mixture is preferably obtained by hotforming. More specifically, they are preferably molded by pressure sintering. Molding by pressure sintering can provide sufficient plastic deformation to magnet powder for rare earth magnet used as raw materials and thus provide a high density rare earth magnet. A method for pressure sintering is not especially limited and hot press or pulsed electric current sintering may be used. When pulsed electric current sintering is used, in particular, it provides advantage of binding in short period. Molding pressure is preferably from about 49 to 980 MPa. Sintering condition is generally at 600 to 850° C. for 0 to 5 minutes. Sintering atmosphere is generally under vacuum atmosphere of not higher than $10^{-1}$ Pa or under inert gas flow.

Temperature in molding process of the mixture is not especially limited; however, compression at ambient temperature is preferable in view of facilitation of work and downsizing of cost. As to work environment, environmental condition such as humidity should be paid attention to prevent oxidative deterioration of the mixture.

(Treatment after Molding)

After molding comes treatment such as fabrication (cutting, polishing and the like), surface treatment (protective film formation, coating and the like) and magnetizing.

Various known techniques may be applied to fabrication of a rare earth magnet. That is, grinding (outer surface grinding, inner surface grinding, plane grinding, molding grinding), cutting (outer peripheral cutting, inner peripheral cutting), lapping, chamfering and the like may be used. Fabrication tool used includes diamond, GC grinding wheel, a cutting machine for outer and inner peripheral, a grinding machine for outer and inner peripheral, NC lathe, milling machine, machining center and the like.

Magnetizing may be performed by static magnetic field or pulsed magnetic field. Guide line to get near saturated magnetized state is magnetic field intensity for magnetizing not less than two times, preferably about 4 times spontaneous coercive force.

The third aspect of the present invention is then explained. The third aspect of the present invention relates to a method for producing a rare earth magnet by using rare earth magnet particles, to whole of or a part of which surface amorphous and/or crystalline terbium oxide represented by the formula (I) is bound:

$$TbO_n \qquad (I)$$

wherein $1.5 < n \leq 2$.

That is, the third aspect of the present invention is a method for producing a rare earth magnet, which includes a coating process of covering whole of or a part of the surface of magnetic powder for rare earth magnet with terbium alkoxide by applying a liquid including the terbium alkoxide to the surface of the magnetic powder for rare earth magnet under dry atmosphere; a hydrolysis process of hydrolyzing the terbium alkoxide at the surface of the magnetic powder for rare earth magnet to obtain first intermediate magnetic powder; a heating process of heat-treating the first intermediate magnetic powder under vacuum atmosphere or inert gas atmosphere to obtain second intermediate magnetic powder; a filling process of filling the second intermediate magnetic powder into a mold; and a molding process of molding the second intermediate magnetic powder filled in the mold. Explanation of each process is given below in the order thereof.

(Coating Process)

Magnet powder for rare earth magnet is produced by arranging raw materials in accordance with composition of a rare earth magnet to be produced. When Nd—Fe—B type magnet having an $Nd_2Fe_{14}B$ phase as a main phase is produced, Nd, Fe and B are compounded in specified amount. Magnet powder for rare earth magnet can be produced by using a known method, and can be obtained as commercial products. Preferably, anisotropic magnet powder for rare earth magnet produced by a UPSET method using an HDDR method or hot deformation (die-upsetting and backward extrusion) is used. Such anisotropic magnet powder for rare earth magnet is cluster of multiple crystal grains. Crystal grains composing anisotropic magnet powder for rare earth magnet suitably have the average particle diameter not more than diameter of a single magnetic grain in view of improving coercive force. Specifically, the average particle diameter of crystal grains is preferably not larger than 500 nm. The HDDR method is a technique to decompose $Nd_2Fe_{14}B$ compound as a main phase into 3 phases, $NdH_3$, $\alpha$-Fe and $Fe_2B$ by hydrogenation of Nd—Fe—B type alloy, followed by compulsory dehydrogenation to regenerate $Nd_2Fe_{14}B$. The UPSET method is a technique to crash Nd—Fe—B type alloy prepared by an ultra-quenching method, premold and perform hot deformation (die-upsetting and backward extrusion).

The average particle diameter of magnet powder for rare earth magnet is preferably from 1 to 500 μm. The average particle diameter of magnet powder for rare earth magnet below 1 μm may increase the effect of oxidative deterioration due to increased specific surface area of magnet powder for rare earth magnet and thus may decrease magnetic characteristics of a rare earth magnet. On the other hand, the average particle diameter of magnet powder for rare earth magnet over 500 μm may result in crashing of magnet particles caused by pressure during production, which may provide risk to decrease electrical resistance of a rare earth magnet obtained. In addition, when an anisotropic magnet is produced by using anisotropic magnet powder for rare earth magnet as raw materials, it is difficult for a main phase ($Nd_2Fe_{14}B$ phase in Nd—Fe—B type magnet) to have the same orientation direction in magnet powder for rare earth magnet having diameter over 500 μm. The average particle diameter of magnet powder for rare earth magnet can be controlled by selecting a crasher and rare earth magnet particles crashed.

A rare earth alkoxide binds at the surface of magnet powder for rare earth magnet as a rare earth oxide and finally becomes the rare earth oxides present at the boundary of the rare earth magnet particles. Commercially available terbium alkoxide can be used. When terbium alkoxide is liquid, the liquid terbium alkoxide may be coated at the surface of magnet powder for rare earth magnet. When terbium alkoxide is solid, it may be coated at the surface of magnet powder for rare earth magnet by dissolving it in a suitable organic solvent.

Terbium alkoxide is preferably terbium triisopropoxide. Terbium triisopropoxide is preferable because various organic solvents can be used. The organic solvent includes aromatic solvents such as toluene and xylene; nonpolar solvents such as hexane; cyclic ether solvents such as tetrahydrofuran; alcoholic solvents such as isopropylalcohol and 2-ethoxyethanol, which have low boiling points to be removed at low temperature. These organic solvents are preferably dewatered beforehand.

A liquid for terbium surface treatment is produced by using magnet powder for rare earth magnet prepared, terbium alkoxide and, if necessary, an organic solvent, and the magnet powder for rare earth magnet is coated with the terbium alkoxide using this liquid. As described above, when the terbium alkoxide is liquid, the terbium alkoxide itself maybe used to coat magnet powder for rare earth magnet. As compared with silicon alkoxide, aluminum alkoxide, titanium alkoxide and the like, the terbium alkoxide has higher reactivity with moisture and is thus more easily hydrolyzed to more easily generate terbium hydroxide, which is insoluble to an organic solvent. Therefore, it is preferable to pay attention to contamination of even trace of moisture such as by contacting with moisture in air. It is preferable that coating of the terbium alkoxide on the surface of the magnet powder for rare earth magnet is performed at dry atmosphere such as under inert gas atmosphere and the like. The dew point of atmosphere adopted is preferably not higher than −80° C. As described above, an organic solvent to dissolve the terbium alkoxide is preferably used after dewatering.

When an organic solvent is used, the terbiumalkoxide is dissolved in the organic solvent to prepare a liquid for terbium alkoxide coating. Concentration of the coating liquid is selected in the light of the amount of the terbium alkoxide added to magnet powder for rare earth magnet.

Liquid containing the terbiumalkoxide, that is, a liquid terbium alkoxide or an organic solvent containing the terbium alkoxide, is supplied to magnet powder for rare earth magnet so that this liquid penetrates throughout the magnet powder. When an organic solvent is used, the solvent is dried to precipitate the terbium alkoxide at the surface of the magnet powder. In this drying, technique such as drying under reduced pressure and the like maybe used in combination, if necessary. When one-time coating may not provide sufficient coating level of the terbium alkoxide, supplying process of liquid containing the terbium alkoxide may be repeated twice or more. By such work, magnet powder for rare earth magnet having whole or a part of the surface coated with the terbium alkoxide can be obtained.

(Hydrolysis Process)

The first intermediate magnet powder, wherein the surface of magnet powder for rare earth magnet is coated with terbium hydroxide or a compound containing terbium oxyhydroxide, are prepared by hydrolyzing the terbium alkoxide coated on the surface of magnet powder for rare earth magnet. This is attained by exposing magnet powder for rare earth magnet which surface is coated with the terbium alkoxide, obtained by the previous process, to gas atmosphere containing moisture. For example, a method is used for exposing magnet powder for rare earthmagnet which surface is coated with the terbiumalkoxide to the air. However, as terbium carbonate salt may be generated as by-product, exposure to moisture gas without containing carbondioxide is more preferable. A rare earth magnet may be heated at the temperature in the range not to induce oxidative deterioration.

(Heating Process)

In this process, terbium oxide is formed at the surface of magnet powder for rare earth magnet by heat treatment of the above-described first intermediate magnet powder under vacuum atmosphere or inert gas atmosphere to promote polycondensation of a hydrolyzed compound of the terbium alkoxide. As terbium oxide, $Tb_4O_7$ or terbium oxide having oxygen defect tends to be formed. Polycondensation of the hydrolyzed compound of the terbium alkoxide can be accelerated by heating. However, it is preferable to suppress heating in air within 200° C. due to risk of oxidative deterioration of a rare earth magnet by heating in the co-presence of oxygen or moisture. The heat treatment at the temperature of 600° C. or less under vacuum atmosphere or inert gas flow is effective for further promotion of the polycondensation reaction. Inert gas used includes helium, neon, argon and the like.

Optionally, heating process can be carried out after repeating the above-described coating process and hydrolysis process. Further, Coating process, hydrolysis process and heating process may be repeated optionally.

(Filling of the Second Intermediate Magnetic Powder into a Mold)

The second intermediate magnetic powder is filled into a mold. Shape of the mold is not especially limited and may be determined in accordance with the position to which a magnet is applied. In the process of filling the second intermediate magnetic powder into the mold, the powder may preferably be subjected to premolding under appropriate pressure. Pressure for premolding is preferably from about 49 to 490 MPa. Though temperature at premolding process of the second intermediate magnet powder is not especially limited, compression at ambient temperature is preferable in view of facilitation of work and downsizing of necessary cost. As to work environment, humidity should be paid attention to prevent oxidative deterioration of the second intermediate magnet powder. When magnet powder for rare earth magnet used is anisotropic magnet powder, an anisotropic rare earth magnet can be obtained by premolding magnet powder for rare earth magnet, while subjecting the magnetic powder for rare earth magnet to magnetic field orientation. Magnetic field intensity added in this case is from about 1.2 to 2.2 MA/m.

(Molding Process)

A bulk magnet is obtained by molding the second intermediate magnetic powder filled in a mold. Compressing work of the second intermediate magnetic powder by the above-described premolding is not included in the definition of "molding" in the present application. Known equipment generally used in magnet production can be used in molding. The second intermediate magnet powder is preferably obtained by hotforming. More specifically, they are preferably thermoformed under vacuum atmosphere or inert gas atmosphere. While a rare earth magnet is hard and brittle at around room temperature, the hotforming can provide sufficient plastic deformation to magnet powder for rare earth magnet used as raw materials and thus provide a high density rare earth magnet. A method for hotforming is not especially limited and hot press or device for pulsed electric current sintering maybe used for hotforming. Molding pressure is preferably from about 49 to about 980 MPa. Sintering condition is generally at 600 to 850° C. for 0 to 5 minutes. Sintering atmosphere is generally under vacuum atmosphere of not higher than $10^{-1}$ Pa or under inert gas flow.

Temperature in molding process of the second intermediate magnet powder is not especially limited; however, compression at ambient temperature is preferable in view of facilitation of work and downsizing of cost. As to work environment, such as humidity should be paid attention to prevent oxidative deterioration of the second intermediate magnet powder.

(Treatment after Molding)

After molding comes treatment such as fabrication (cutting, polishing and the like), surface treatment (protective film formation, coating and the like) and magnetizing.

Various known techniques may be applied to fabrication of a rare earth magnet. That is, grinding (outer surface grinding, inner surface grinding, plane grinding, molding grinding), cutting (outer peripheral cutting, inner peripheral cutting), lapping, chamfering and the like may be used. Fabrication tool used includes diamond, GC grinding wheel, a cutting machine for outer and inner peripheral, a grinding machine for outer and inner peripheral, NC lathe, milling machine, machining center and the like.

Magnetizing may be performed by static magnetic field or pulsed magnetic field. Guide line to get near saturated magnetized state is magnetic field intensity for magnetizing not lower than two times, preferably about 4 times spontaneous coercive force.

In the producing method of the third aspect of the present invention, terbium oxide is formed at the surface of magnet powder for rare earth magnet beforehand by using terbium alkoxide. When such producing method is used, a rare earth magnet wherein the terbium oxide is present at the boundary of rare earth magnet particles can be produced by the addition of small amount of the terbium oxide. Therefore, it is possible to provide high electrical resistance value and suppression ability of eddy current to the rare earth magnet, while maintaining high maximum energy product. In addition, this method provides hydrolysis of the terbium alkoxide after coating on the surface of magnet powder for rare earth magnet without using sol liquid composed of the hydrolyzed compound, and thus suppresses generation of gel or precipitate of sol in producing process of the rare earth magnet. That is, the method for production of the third aspect of the present invention can contribute to stable production of the rare earth magnet of the first aspect of the present invention.

Figure 3:
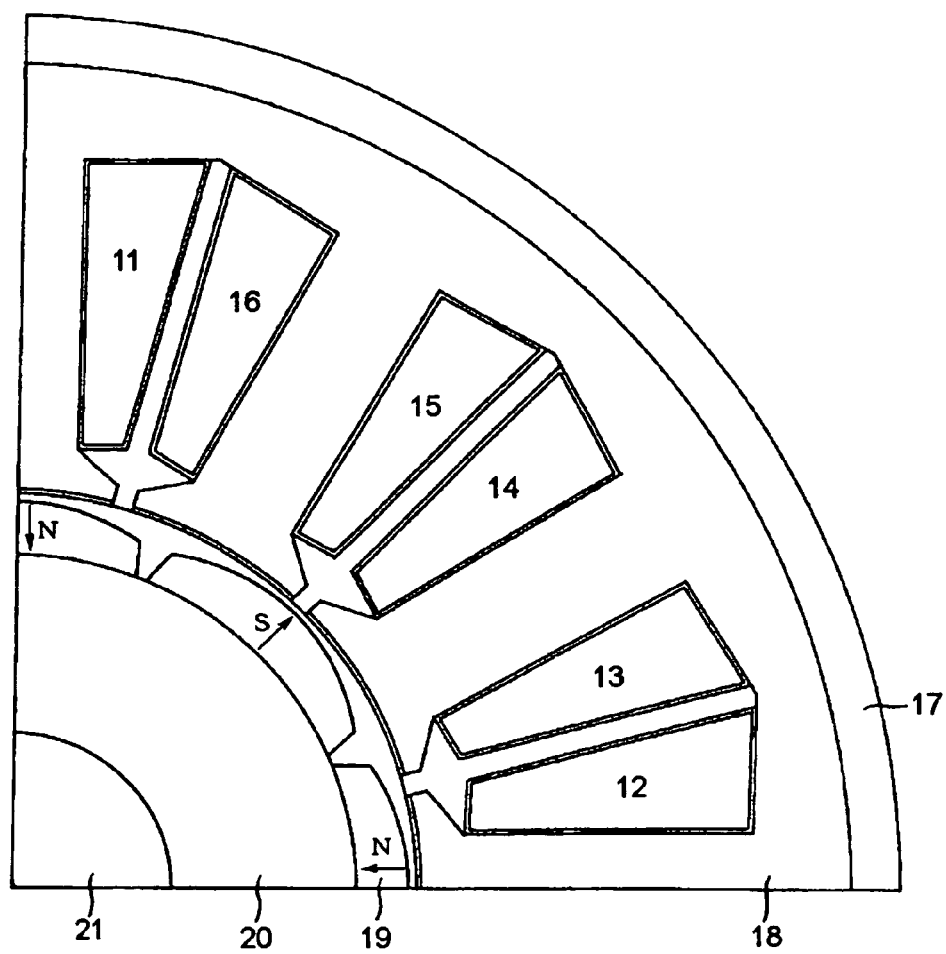
FIG. 3 is a cross-sectional view of a quarter of a surface magnet type motor, which has a concentrated winding, and is equipped with a rare earth magnet with high electric resistance of the present invention.

Now, a motor, the fourth aspect of the present invention, is explained. The fourth aspect of the present invention is a motor including the rare earth magnet of the first aspect of the present invention. FIG. 3, which is used as reference, is a cross-sectional view of a quarter of a surface magnet type motor, which has a concentrated winding, and is equipped with a rare earth magnet with high electric resistance of the present invention. In the figure, 11 represents u phase winding, 12 represents U-phase winding, p represents V-phase winding, 14 represents V-phase winding, 15 represents W-phase winding, 16 represents W-phase winding, 17 represents an aluminum case, 18 represents a stator, 19 represents magnet, 20 represents rotor iron and 21 represents an axis. A rare earth magnet of the present invention has not only high electrical resistance but also superior magnetic characteristics. Therefore, by a motor produced by-using the rare earth magnet of the present invention, enhancement of continuous motor output can be easily achieved, thus the magnet is suitable to a motor for medium to large output. Furthermore, a motor mounted with the rare earth magnet of the present invention can contributes to downsizing of a product due to having superior magnetic characteristics, improve fuel consumption with body weight reduction when applied to automotive parts. Further, the motor is effective as a motor for driving an electric automobile or a hybrid electric automobile. It also fulfills a big role in prevalence of an electric car or a hybrid electric car because it can be installed even at such place as has conventionally been difficult to secure space.

EXAMPLES

Example 1

As magnet powder for rare earth magnet, Nd—Fe—B type anisotropic magnet powder, prepared by using a known HDDR method, were used. The procedure for producing the magnet powder for rare earth magnet is as follows. First, an ingot with composition of $Nd_{12.6}Fe_{bal}Co_{17.4}B_{6.5}Ga_{0.3}Al_{0.5}Zr_{0.1}$ was prepared. This ingot was homogenized by holding at 1120° C. for 20 hours. The homogenized ingot was hold in hydrogen atmosphere while increasing the temperature from room temperature to 500° C., then up to 850° C., followed by holding under vacuum atmosphere at 850° C. and cooling to obtain an alloy having recombined cluster texture (crystal grains) showing a fine ferromagnetic phase. This alloy was pulverized under argon gas atmosphere by use of a jaw crasher and a brown mill to obtain magnet powder for rare earth magnet having the average particle diameter of not larger than 425 µm.

$Tb_4O_7$ powder as terbium oxides and the magnet powder for rare earth magnet were mixed to obtain a mixture composed of both types of powder. The addition amount of $Tb_4O_7$ powder was adjusted to be 5 wt % based on the total weight of the mixture composed of the magnet powder for rare earth magnet and the terbium oxide powder.

This mixture was filled into a mold. And, the mixture was premolded, while subjecting the magnetic powder for rare earth magnet to magnetic field orientation by loading magnetic field. Magnetic field intensity for orientation was 1.6 MA/m and molding pressure was $2 \times 10^2$ MPa. The premolded mixture was subjected to hotforming under vacuum atmosphere to obtain a bulk rare earth magnet. Hot press equipment was used in molding. Molding temperature was 650° C., holding period was 3 minutes and molding pressure was 980 MPa.

Magnet density, coercive force, maximum energy product, and electrical resistivity of the obtained magnet were measured. Magnet density was $7.6 \times 10^3$ kg/m$^3$, coercive force was 0.94 MA/m, maximum energy product was 0.22 MJ/m$^3$, and electrical resistivity was 31.0 µΩm. The rare earth magnet thus obtained was an anisotropic Nd—Fe—B type rare earth magnet superior in both maximum energy product and electrical resistivity. Results are summarized in Table 1.

Evaluation items of the rare earth magnet were measured by the following procedure. Magnet density was determined by size and mass of the rare earth magnet. Magnet characteristics (coercive force, maximum energy product) were measured using "TRF-5AH-25Auto", a BH tester made by Toei Industry Co., Ltd. after magnetizing test samples at 10 T magnetic field by use of "MPM-15", a pulse excitement type magnetizer made by Toei Industry Co., Ltd. Electrical resistivity was measured by a 4 probe method using a resistivity probe made by NPS Co., Ltd. Probe material was tungsten carbide, probe tip radius was 40 µm, probe clearance was 1 mm and total weight of 4 probes was about 400 g. Content of terbium oxide was calculated by conversion from density of $Tb_4O_7$. Rare earth magnets obtained in the following Examples and Comparative Examples were also evaluated by similar methods.

Example 2

As magnet powder for rare earth magnet, Nd—Fe—B type anisotropic magnet powder, produced by using a known HDDR method in similar way to Example 1, were used. As a method for producing the rare earth magnet, the following method was adopted; terbium triisopropoxide, which is terbium alkoxide, was coated on the surface of the magnet powder for rare earth magnet, polycondensating the resultant by hydrolysis and heat treatment of terbium triisopropoxide, and thus obtained magnet powder for rare earth magnet were used, at the surface of which terbium oxide is bound. Detailed procedure is as follows:

(1) 200 g of terbium triisopropoxide as terbium alkoxide was dissolved by adding dewatered hexane as an organic solvent in a glove box filled with argon gas, where the dew point is not higher than −80° C., and then liquid for terbium surface treatment was prepared in the total volume of 1000 ml.

(2) 180 mL of the liquid for terbium surface treatment was added into 1000 g of magnet powder for rare earth magnet in the glove box under argon atmosphere, followed by stirring and removal of the solvent to cover the surface of magnet powder for rare earth magnet with terbium triisopropoxide.

(3) An open vessel containing water was placed in the glove box and evaporated water for 5 hours to hydrolyze terbium triisopropoxide at the surface of magnet powder for rare earth magnet to obtain the first intermediate magnetic powder.

(4) The first intermediate magnetic powder was heat-treated at 500° C. for 30 minutes under argon gas flow to obtain the second intermediate magnetic powder.

(5) The second intermediate magnetic powder were filled into a mold, followed by premolding the second intermediate magnetic powder in the mold, while subjecting the magnetic powder for rare earth magnet to magnetic field orientation by loading magnetic field. Intensity of orientation magnetic field was 1.6 MA/m and molding pressure was $2 \times 10^2$ MPa.

(6) Thus premolded second intermediate magnetic powder was molded by hotforming under vacuum atmosphere to obtain a bulk rare earth magnet. Hot press equipment was used for molding. Molding temperature was 650° C., holding period was 3 minutes and molding pressure was 980 MPa.

The rare earth magnet thus obtained had magnet density of $7.6 \times 10^3$ kg/m$^3$, coercive force of 0.96 MA/m, maximum energy product of 0.24 MJ/m$^3$ and electrical resistivity of 22.0 μΩm. The rare earth magnet thus obtained was an anisotropic Nd—Fe—B type rare earth magnet superior in both maximum energy product and electrical resistivity. Results are summarized in Table 1. Composition analysis obtained by using energy dispersion type X-ray analysis equipment attached to transmission electron microscope showed that composition of components present at the boundary of rare earth magnet particles was O/Tb=1.7.

Example 3

As magnet powder for rare earth magnet, Nd—Fe—B type anisotropic magnet powder, produced by using a known HDDR method in similar way to Example 1, were used. As a method for producing the rare earth magnet, the following method was adopted; terbium triisopropoxide, which is terbium alkoxide, was coated on the surface of the magnet powder for rare earth magnet, polycondensating the resultant by hydrolysis and heat treatment of terbium triisopropoxide, and thus obtained magnet powder for rare earth magnet were used, at the surface of which terbium oxide is bound. Detailed procedure is as follows:

(1) 150 g of terbium triisopropoxide as the terbium alkoxide was dissolved by adding dewatered tetrahydrofuran as an organic solvent in a glove box filled with argon gas, where the dew point is not higher than −80° C., and then liquid for terbium surface treatment was prepared in the total volume of 1000 ml.

(2) 360 mL of the liquid for terbium surface treatment was added into 1000 g of magnet powder for rare earth magnet in the glove box under argon atmosphere, followed by stirring and removal of the solvent to cover the surface of magnet powder for rare earth magnet with terbium triisopropoxide.

(3) An open vessel containing water was placed in the glove box and evaporated water for 5 hours to hydrolysis terbium triisopropoxide at the surface of magnet powder for rare earth magnet to obtain the first intermediate magnetic powder.

(4) The first intermediate magnetic powder was heat treated at 500° C. for 30 minutes under argon gas flow to obtain the second intermediate magnetic powder.

(5) The second intermediate magnetic powder were filled into a mold, followed by premolding the second intermediate magnetic powder in the mold, while subjecting the magnetic powder for rare earthmagnet to magnetic field orientation by loading magnetic field. Intensity of orientation magnetic field was 1.6 MA/m and molding pressure was $2 \times 10^2$ MPa.

(6) Thus premolded second intermediate magnetic powder was molded by hotforming under vacuum atmosphere to obtain a bulk rare earth magnet. Hot press equipment was used for molding. Molding temperature was 700° C., holding period was 3 minutes and molding pressure was 490 MPa.

The rare earth magnet thus obtained had magnet density of $7.6 \times 10^3$ kg/m$^3$, coercive force of 0.93 MA/m, maximum energy product of 0.21 MJ/m$^3$ and electrical resistivity of 34.0 μΩm. The rare earth magnet thus obtained was an anisotropic Nd—Fe—B type rare earth magnet superior in both maximum energy product and electrical resistivity. Results are summarized in Table 1. Composition analysis obtained by using energy dispersion type X-ray analysis equipment attached to transmission electron microscope showed that composition of components present at the boundary of rare earth magnet particles was O/Tb=1.7.

Example 4

As magnet powder for rare earth magnet, Nd—Fe—B type anisotropic magnet powder, prepared by using a known UPSET method, was used. The procedure for producing the magnet powder for rare earth magnet is as follows. First, an ingot with composition of $Nd_{13.7}Fe_{bal}Co_{6.7}B_{5.5}Ga_{0.6}$ was prepared. This ingot was dissolved by utilizing high frequency and the molten metal was injected onto a single roll rotating at peripheral speed of 30 m/sec to obtain Nd Fe—B type rapidly quenched ribbon, which was then crashed in a mortar to arrange average particle diameter of not larger than 500 μm. Then, the super quenched thin band thus crashed was filled in a cylindrical container, followed by evacuation inside the container and sealed the cylindrical container. The container was heated by utilizing high frequency at 800° C. and compressed in uniaxial way by use of a press machine. Nd—Fe—B type magnet material was taken out from the container. And then, magnet powder for rare earth magnet having average particle diameter of not larger than 425 μm was produced by use of a coffee mill.

As a method for producing the rare earth magnet, the following method was adopted; terbium triisopropoxide, which is terbium alkoxide, was coated on the surface of the magnet powder for rare earth magnet, polycondensating the resultant by hydrolysis and heat treatment of terbium triisopropoxide, and thus obtained magnet powder for rare earth magnet were used, at the surface of which terbium oxide is bound. Detailed procedure is as follows:

(1) 200 g of Terbium triisopropoxide as the terbium alkoxide was dissolved by adding dewatered toluene as an organic solvent in a glove box filled with argon gas, where the dew point is not higher than −80° C., and then liquid for terbium surface treatment was prepared in the total volume of 1000 ml.

(2) 273 mL of the liquid for terbium surface treatment was added into 1000 g of magnet powder for rare earth magnet in a glove box under argon atmosphere, followed by stirring and removal of the solvent to cover the surface of magnet powder for rare earth magnet with terbium triisopropoxide.

(3) An open vessel containing water was placed in the glove box and evaporated water for 5 hours to hydrolysis terbium triisopropoxide at the surface of magnet powder for rare earth magnet to obtain the first intermediate magnetic powder.

(4) The first intermediate magnetic powder was heat treated at 500° C. for 30 minutes under argon gas flow to obtain the second intermediate magnetic powder.

(5) The second intermediate magnetic powder were filled into a mold, followed by premolding the second intermediate magnetic powder in the mold, while subjecting the magnetic powder for rare earthmagnet to magnetic field orientation by loading magnetic field. Intensity of orientation magnetic field was 1.6 MA/m and molding pressure was $2 \times 10^2$ MPa.

(6) Thus premolded second intermediate magnetic powder was molded by hotforming under vacuum atmosphere to obtain a bulk rare earth magnet. Hot press equipment was used for molding. Molding temperature was 700° C., holding period was 3 minutes and molding pressure was 490 MPa.

The rare earth magnet thus obtained had magnet density of $7.6 \times 10^3$ kg/m$^3$, coercive force of 0.91 MA/m, maximum energy product of 0.19 MJ/m$^3$ and electrical resistivity of 82.0 µΩm. The rare earth magnet thus obtained was an anisotropic Nd—Fe—B type rare earth magnet superior in both maximum energy product and electrical resistivity. Results are summarized in Table 1. Composition analysis obtained by using energy dispersion type X-ray analysis equipment attached to transmission type electron microscope showed that composition of components present among rare earth magnet particles was O/Tb=1.6.

Comparative Example 1

A bulk rare earth magnet was obtained similarly as in Example 1, except that the magnet powder for rare earth magnet was not mixed with the terbium oxide powder.

The rare earth magnet thus obtained had magnet density of $7.6 \times 10^3$ kg/m$^3$, coercive force of 0.96 MA/m, maximum energy product of 0.25 MJ/m$^3$ and electrical resistivity of 1.4 µΩm. The rare earth magnet thus obtained was an anisotropic Nd—Fe—B type rare earth magnet superior in maximum energy product but inferior in electrical resistivity. Results are summarized in Table 1.

Example 5

The rare earth magnet obtained in Example 3 was applied to a surface magnet type permanent magnet motor (having a 12 pole stator and an 8 pole rotor). FIG. 3 is a cross-sectional view of a quarter of the surface magnet type motor prepared with concentrated winding. Outside is an aluminum case 17, inside thereof is a stator 18, 11-12 represent U-phase winding, p-14 represent V-phase winding and 15-16 represent W-phase winding. The stator 18 is a laminated body of magnetic steel sheets. Magnet 19 with shape as shown in the drawing was placed on rotor iron 20. Incidentally, 21 represents an axis. Continuous output of the motor produced using the rare earth magnet of the Example 3 was 1.8 kW.

Comparative Example 2

A motor was produced similarly as in Example 5 except that the rare earth magnet used in Comparative Example 1 was adopted. Continuous output of the motor produced was 1.2 kW.

TABLE 1

| | Magnet powder for rare earth magnet | Raw materials of terbium oxide | Content of terbium oxide (wt %) (converted value for terbium oxide) | Bulk magnet density ($10^3$ kg/m$^3$) | Coercive force (MA/m) | Maximum energy product (MJ/m$^3$) | Electrical resistivity (µΩm) |
|---|---|---|---|---|---|---|---|
| Example 1 | Nd—Fe—B (HDDR) | Tb$_4$O$_7$ powder | 5 | 7.6 | 0.94 | 0.22 | 31.0 |
| Example 2 | Nd—Fe—B (HDDR) | Terbium triisopropoxide | 2 | 7.6 | 0.96 | 0.24 | 22.0 |
| Example 3 | Nd—Fe—B (HDDR) | Terbium triisopropoxide | 3 | 7.6 | 0.93 | 0.21 | 34.0 |
| Example 4 | Nd—Fe—B (UPSET) | Terbium triisopropoxide | 8 | 7.6 | 0.91 | 0.19 | 82.0 |
| Comparative Example 1 | Nd—Fe—B (HDDR) | None | 0 | 7.6 | 0.96 | 0.25 | 1.4 |

The technical scope of the present invention is by no means limited to the above-described Examples.

The entire disclosure of Japanese Patent Application No. 2003-424639 filed on Dec. 22, 2003 including specification, claims, drawings and summary are incorporated herein by reference in its entirety.

What is claimed is:

1. A rare earth magnet, comprising:
   rare earth magnet particles; and
   amorphous and/or crystalline terbium oxide present at a boundary of the rare earth magnet particles and represented by the formula: TbO$_n$, wherein $1.5 < n \leq 2$;
   wherein said rare earth magnet particles are connected by said terbium oxide, and wherein individual rare earth magnet particles comprise a cluster of fine crystal grains;
   wherein the terbium oxide is contained in an amount of 1 to 10 wt % based on a weight of the rare earth magnet.

2. A rare earth magnet according to claim 1, which is obtained by hotforming magnet powder to produce a rare earth magnet having terbium oxide bound to whole of or a part of the surface of the rare earth magnet particles.

3. A rare earth magnet according to claim 2, wherein the terbium oxide bound to the surface of the rare earth magnet particles is obtained by hydrolyzing terbium alkoxide placed on the surface of the rare earth magnet particles.

4. A rare earth magnet according to claim 1, wherein an average diameter of the rare earth magnet particles is from 1 to 500 µm.

5. A rare earth magnet according to claim 1, wherein the rare earth magnet is a Nd—Fe—B type magnet.

6. A rare earth magnet according to claim 1, wherein the rare earth magnet is an anisotropic magnet.

7. A method for producing a rare earth magnet, comprising:
a coating process of covering whole of or a part of a surface of rare earth magnet powder with terbium alkoxide by applying a liquid including the terbium alkoxide to the surface of the rare earth magnet powder under a dry atmosphere;
a hydrolysis process of hydrolyzing the terbium alkoxide at the surface of the rare earth magnet powder to obtain a first intermediate magnetic powder;
a heating process of heat-treating the first intermediate magnetic powder under a vacuum atmosphere or an inert gas atmosphere to obtain a second intermediate magnetic powder;
a filling process of filling the second intermediate magnetic powder into a mold; and
a molding process of molding the second intermediate magnetic powder filled in the mold to produce a rare earth magnet comprising rare earth magnet particles and amorphous and/or crystalline terbium oxide present at a boundary of the rare earth magnet particles represented by the formula: $TbO_n$, wherein $1.5 < n \leq 2$;
wherein said rare earth magnet particles are connected by said terbium oxide, and at least one rare earth magnetic particle comprises a cluster of fine crystal grains;
wherein the terbium oxide is contained in an amount of 1 to 10 wt % based on a weight of the rare earth magnet.

8. A method for producing the rare earth magnet according to claim 7, wherein the hydrolysis process is a process of hydrolyzing the terbium alkoxide at the surface of the rare earth magnet powder by exposing the rare earth magnet powder covered with the terbium alkoxide to water-containing gas to obtain the first intermediate magnetic powder.

9. A method for producing the rare earth magnet according to claim 7, wherein the rare earth magnet powder is an anisotropic magnet powder, and which further comprises between the heating process and the molding process a premolding process of premolding the rare earth magnet powder while subjecting the rare earth magnet powder to magnetic field orientation.

10. A motor comprising the rare earth magnet of claim 1.

11. The rare earth magnet according to claim 1, wherein said rare earth magnet particles are produced from an anisotropic rare earth magnet powder by use of an HDDR method or by use of hot deformation.

12. The rare earth magnet according to claim 1, wherein a grain size of said crystal grains is not more than 500 nm.

13. The rare earth magnet of claim 1, wherein the rare earth magnet exhibits an electrical resistivity within a range from 22.0 µΩm to 82.0 µΩm.

14. The rare earth magnet of claim 13, wherein the rare earth magnet further exhibits a coercive force of 0.91 to 0.96 MA/m.

* * * * *